(12) United States Patent
Dattke et al.

(10) Patent No.: US 7,406,695 B2
(45) Date of Patent: Jul. 29, 2008

(54) AUTOMATICALLY UPGRADEABLE EXTENSION OF SOFTWARE

(75) Inventors: Rainer Dattke, Bruchsal (DE); Michael Acker, Grossfischlingen (DE); Sigrun Wintzheimer, Hambrucken (DE); Georg Wilhelm, Kronau (DE); Juergen Remmel, Muhlhausen (DE); Steffi Kramer, München (DE)

(73) Assignee: SAP Aktiengesellschaft, Walldorf (DE)

( * ) Notice: Subject to any disclaimer, the term of this patent is extended or adjusted under 35 U.S.C. 154(b) by 679 days.

(21) Appl. No.: 10/347,112

(22) Filed: Jan. 17, 2003

(65) Prior Publication Data

US 2004/0143835 A1 Jul. 22, 2004

(51) Int. Cl.
G06F 3/00 (2006.01)
G06F 9/44 (2006.01)
G06F 9/46 (2006.01)
G06F 13/00 (2006.01)

(52) U.S. Cl. ..................... 719/315; 719/331

(58) Field of Classification Search ......... 719/310–320, 719/328–332; 709/223, 231–232, 245
See application file for complete search history.

(56) References Cited

U.S. PATENT DOCUMENTS

| | | | | |
|---|---|---|---|---|
| 5,764,985 A | * | 6/1998 | Smale | 719/328 |
| 5,933,645 A | * | 8/1999 | Wallack | 717/170 |
| 6,163,812 A | * | 12/2000 | Gopal et al. | 719/310 |
| 6,996,832 B2 | * | 2/2006 | Gunduc et al. | 719/331 |
| 2001/0011368 A1 | * | 8/2001 | Graser et al. | 717/3 |
| 2002/0174262 A1 | | 11/2002 | Marcos et al. | |
| 2003/0149801 A1 | * | 8/2003 | Kushnirskiy | 709/328 |
| 2003/0167320 A1 | * | 9/2003 | Perez | 709/223 |
| 2003/0191677 A1 | * | 10/2003 | Akkiraju et al. | 705/8 |
| 2003/0233477 A1 | * | 12/2003 | Ballinger et al. | 709/246 |
| 2004/0034860 A1 | * | 2/2004 | Fernando et al. | 719/315 |

(Continued)

FOREIGN PATENT DOCUMENTS

EP 0 924 617 A2 6/1999

(Continued)

OTHER PUBLICATIONS

"Common Object Request Broker Architecture: Core Specification," An Adopted Specification of the Object Management Group, Inc. http://www.omg.org/cgi-bin/apps/doc (Dec. 2002).

(Continued)

*Primary Examiner*—Meng-Ai An
*Assistant Examiner*—Diem K Cao
(74) *Attorney, Agent, or Firm*—Fish & Richardson P.C.

(57) ABSTRACT

Methods and apparatus, including computer program products, for implementing extensions for computer program applications. A program according to one aspect of the invention has instructions to receive an application call to an extension method defined in an extension object definition, the extension object definition having associated extension object implementations, the extension object implementations providing extension method implementations of the extension method; instructions operable to obtain results by calling multiple extension method implementations of the extension method; and instructions operable to respond to the application call using the results obtained from the extension method implementations. A method according to another aspect includes the steps of deploying multiple extension method implementations for an extension method; and executing the multiple extension method implementations to determine the results of calling the extension method.

33 Claims, 6 Drawing Sheets

U.S. PATENT DOCUMENTS

2004/0205473 A1* 10/2004 Fisher et al. ................ 715/500
2005/0251809 A1* 11/2005 Gunduc et al. .............. 719/310

FOREIGN PATENT DOCUMENTS

WO     WO 98/02812     1/1998

OTHER PUBLICATIONS

"Object Request Broker-Directed Server Object Replication," IBM Technical Disclosure Bulletin, IBM Corp., New York, 39:5 (1996).

Mancini et al., "Formal Specification of N-Modular Redundancy," http://portal.acm.org/citation.cfm p. 199 (1986).

* cited by examiner

AUTOMATICALLY UPGRADEABLE EXTENSION OF SOFTWARE

BACKGROUND

The present invention relates to data processing by digital computer, and more particularly to extending a standard application.

A standard software application is developed by an application developer to satisfy the requirements of multiple customers of the standard application. Specific customers of a standard software application may need to extend the standard application to add customer-specific features that are not implemented by the standard application. In addition, customers of the standard application may also need to customize the features of the standard application by providing customer-specific extensions for the features implemented by the standard application. Modification of the standard application is one of the approaches for providing application extensions for a standard application. The modification approach can require the generation of multiple versions of the standard application. A version of the standard application generated for a specific customer can include all the application extensions required by the specific user. A standard application using the modification approach to implement application extensions can be difficult to maintain because each version of the standard application must be generated whenever the standard application is upgraded.

Business Add-Ins, defined by SAP R/3, available from SAP AG of Walldorf (Baden) Germany, represent another approach allowing customers to provide application extensions for a standard application. Business Add-Ins are defined parts within a standard SAP application where an application extension can be used to add additional code without modifying the standard SAP application. In order to extend the standard SAP application, a Business Add-In (BAdI) is defined by the application developer for the standard application. The application developer also defines an interface for the BAdI. The defined interface for the BAdI is used to create an adapter class for implementing the BAdI. The adapter class is used by the extension developer developing the application extension to provide an implementation of the BAdI. The application developer extends the standard application by creating an instance of the adapter class in the standard application and calling the corresponding methods of the adapter class at the appropriate time. In order to use a BAdI, an extension developer must provide his own implementation of the BAdI by implementing the enhancements defined by the BAdI and activating the implementations of the enhancements. The enhancements provided by the BAdI implementation are then called at runtime.

A Java™ application can be extended at the design level using specific Design Patterns, including, Observer, Factory, Decorator, Visitor, and Interceptor patterns. A Factory method provides a simple decision making class which returns one of several possible subclasses of an abstract base class depending on data it is provided. In the Decorator pattern, a class that surrounds a given class adds new capabilities to the given class and passes all the unchanged methods to the underlying class. The Observer pattern defines the way a number of classes can be notified of a change. The Visitor pattern can be used to add new operations for an arrangement of classes without changing the individual class definitions. An Interceptor pattern can be used to provide a simple place holder for a class that can be implemented later in the development cycle.

Java also provides extension approaches at the architecture level using object oriented frameworks, replacement of components, application programming interface (API) approaches, messaging techniques and declarative approaches (e.g., the Apache Jakarta framework Struts). In addition to these approaches Java also provides byte code enhancement techniques, such as AspectJ, HyperJ, or JMangle, which can be used to extend Java applications. Extensions to a Java application can also be implemented through dynamic proxy classes, using the dynamic proxy API. A dynamic proxy class is a class that implements a list of interfaces specified at runtime when the class is created. A method invocation through one of the interfaces on an instance of a dynamic proxy class is encoded and dispatched to another object through a uniform interface. A dynamic proxy class can be used to create a type-safe proxy object for a list of interfaces without requiring pre-generation of the class prior to compilation.

SUMMARY OF THE INVENTION

The present invention provides methods and apparatus, including computer program products, for implementing extensions for computer program applications.

In general, in one aspect, the invention provides methods and apparatus, including computer program products, for extending computer program applications. A program according to this aspect has instructions operable to receive an application call to an extension method defined in an extension object definition, the extension object definition having associated extension object implementations, the extension object implementations providing extension method implementations of the extension method; instructions operable to obtain results by calling multiple extension method implementations of the extension method; and instructions operable to respond to the application call using the results obtained from the extension method implementations.

Advantageous implementations of the invention include one or more of the following features.

The extension object definition is associated with an extension registry; and the program has instructions to check the extension registry to determine extension object implementations providing registered extension method implementations of the extension method, and instructions to call the registered extension method implementations to obtain results of calling the extension method implementations of the extension method.

The program also has instructions to identify extension object implementations providing extension method implementations of the extension method; to generate a proxy for the identified extension object implementations, the proxy being operable to call multiple extension object implementations; and to call the proxy to obtain results of calling the extension method implementations of the extension method provided by the identified extension object implementations.

The proxy is generated at a compile time or deploy time. Alternatively, the proxy is a dynamic proxy generated dynamically at run time. The program can also have instructions for an extension factory to generate a proxy object.

The extension object implementations have associated filter attribute values; and the program also has instructions to call exactly those extension method implementations having associated filter attribute values satisfying one or more predetermined criteria. The filter attribute values can be stored in a central repository.

The extension object implementations have an associated sorter; and the program also has instructions to obtain results by calling extension method implementations are operable to call the extension method implementations in an order determined by the sorter.

The extension object implementations have an associated logger; and the program also has instructions to log the calls to the extension method implementations using the logger.

The extension object implementations have an associated result handler; and the program also has instructions to use the result handler to receive extension results obtained by calling the extension method implementations, and to determine the results using the extension results. The associated result handler can be a default result handler. If there is no associated result handler, the extension method implementations can be called in sequence, a first extension method implementation being called first, a last extension method implementation being called last; and the instructions to obtain results by calling extension method implementations are operable to return the results obtained by calling the last extension method implementation.

In general, in another aspect, the invention provides methods and apparatus, including program products, for deploying extensions to computer program applications. A method according to this aspect includes the steps of deploying multiple extension method implementations for an extension method; and executing the multiple extension method implementations to determine the results of calling the extension method.

Advantageous implementations of the invention further include one or more of the following features.

The multiple extension method implementations are deployed into a runtime environment that generates a dynamic proxy for the multiple extension method implementations; and the dynamic proxy is executed to execute the multiple extension method implementations to determine the results of executing the extension method.

The multiple extension method implementations have associated filter attribute values; and exactly those extension method implementations having associated filter attribute values satisfying one or more predetermined criteria are executed to determine the results of executing the extension method.

The multiple extension method implementations have an associated sorter that determines the order of executing the extension method implementations.

The multiple extension method implementations have an associated logger that the calls to the extension method implementations.

The multiple extension method implementations have an associated result handler that receives extension results obtained by calling the extension method implementations and determines the results of the extension method using the extension results. The result handler can be a default result handler. If there is no associated result handler, the extension method implementations are executed in sequence, a first extension method implementations being executed first, and a last extension method implementation being executed last; and the results obtained by executing the last extension method implementation are used.

The invention can be implemented to realize one or more of the following advantages. Standard Java application can be modified as part of a future release without requiring any specific modifications to support existing application extensions. Multiple implementations can be supported for each application extension, and result of calling the multiple implementations can be evaluated using sorting, logging, and result processors. The application extensions can be activated and deactivated at runtime and they can be monitored at runtime. A future release of a standard application need not be aware of existing extensions and need not implement existing extensions in the future release. One implementation of the invention provides all of the above advantages.

The details of one or more implementations of the invention are set forth in the accompanying drawings and the description below. Further features, aspects, and advantages of the invention will become apparent from the description, the drawings, and the claims.

DETAILED DESCRIPTION

Figure 1:
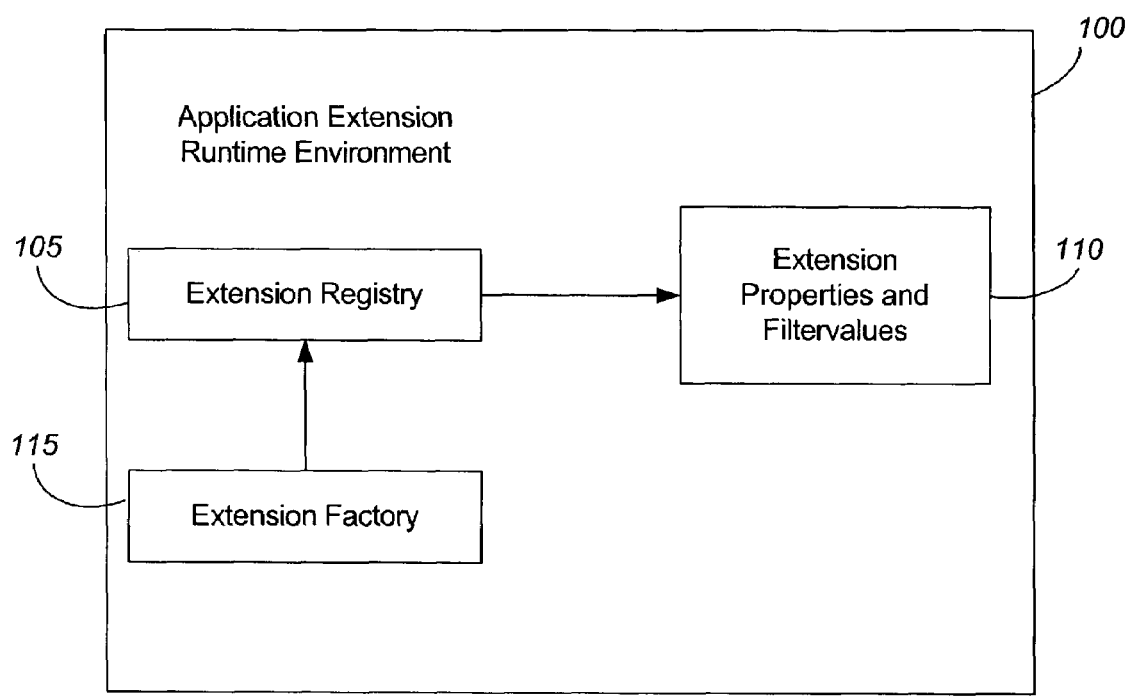
FIG. 1 is a block diagram illustrating an application extension runtime environment for applications.

FIG. 1 is a block diagram illustrating an application extension runtime environment 100 for standard applications, according to one aspect of the invention. The standard application can be programmed in Java. The application extension runtime environment 100 includes an extension factory 115, an extension registry 105, and a repository 110 for extension properties, e.g., BAdI properties and filter values. The extension factory 115 implements a factory method that can be used to generate a dynamic proxy for the an extension object implemented by the application extension. The extension objects can be implemented in the programming language of the standard application or other programming languages. All the extension objects implemented by the application extension are registered in the extension registry 105. In addition, the properties and filter-values associated with each extension object registered in the extension registry 105 are stored in a central repository 110.

Figure 2:
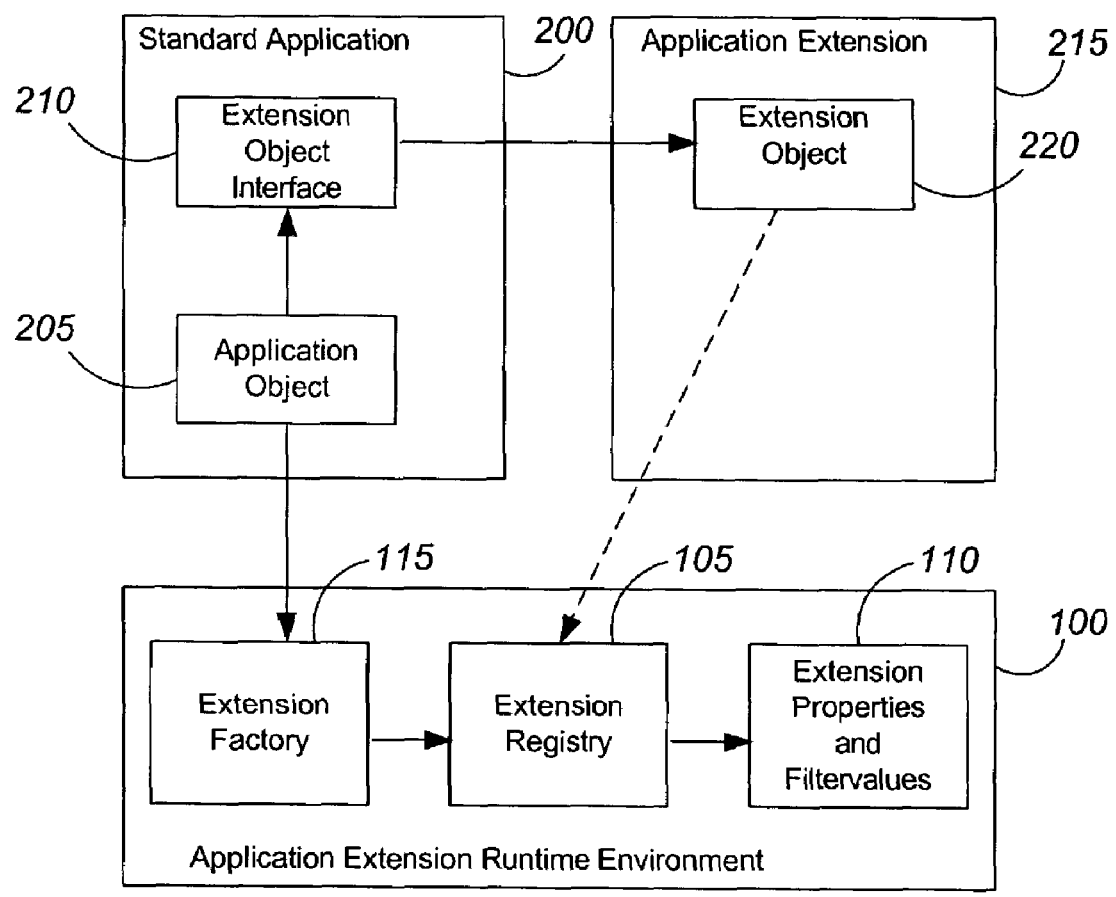
FIG. 2 illustrates the interfaces between a standard application, an application extension, and the application extension runtime environment.

FIG. 2 illustrates the interfaces between a standard application 200, an application extension 215 to the standard application, and the application extension runtime environment 100. An extension object 220, implemented by the application extension 215, is registered in the extension registry 105 that is part of the application extension runtime environment. The properties and filter-values associated with the extension object 220 are stored in the central repository 110 for extension properties and filter-values. The application extension 215 can be one that was developed by an extension developer. A method of an application object 205, implemented by the standard application 200, calls the extension factory 115 for the extension object 220. The extension factory 115 requests the extension object 220 from the extension registry 105. The extension object interface 210 is implemented by the extension object 220, which is part of the application extension 215. The application object 205 calls the extension object 220 using the extension object interface 210.

Figure 3:
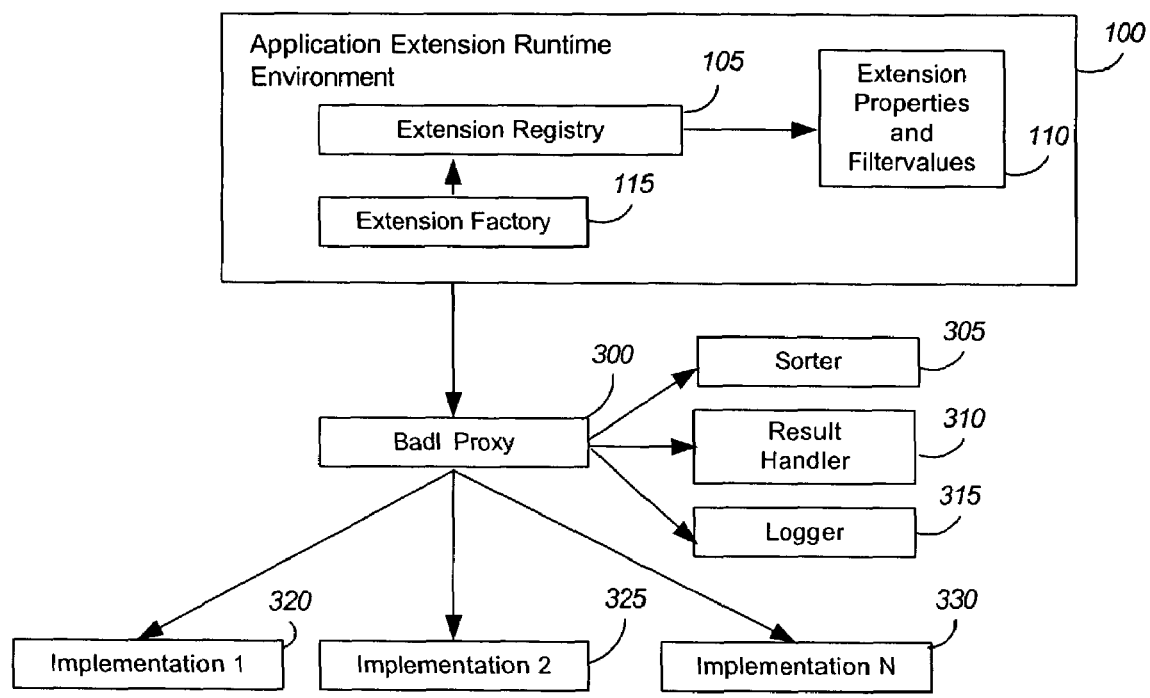
FIG. 3 is a block diagram illustrating the interfaces between the application extension runtime environment and the implementations of the extension object.

FIG. 3 is a block diagram illustrating the interfaces between the application extension runtime environment 100 and the implementations of the extension object. In one implementation, the extension registry 105 is a BAdI registry, the extension factory 115 is a BAdI factory, and the extension properties in the repository 110 are BAdI properties. The extension factory 115 checks the extension registry 105 to determine if there are any implementations of the extension object that has been called by the standard application. The application extension can include more than one implementation for the extension object. The example extension object illustrated in the figure includes implementations 320, 325, and 330. If there are implementations of the extension object that have been registered in the extension registry 105, the extension factory generates a dynamic proxy for the extension object interface 300.

In FIG. 3, the dynamic proxy for the extension object interface 300 can include interfaces to a sorter 305 and a logger 310 for the extension object if a sorter and logger are implemented by the extension object. The dynamic proxy for the extension object interface can also include interfaces to call the concrete methods of the extension object. The standard application calls a concrete method implemented by the extension object using the dynamic proxy for the extension object interface 300. The sorter 305 can be used to sort through the implementations of the extension object and determine the order in which the implementations should be called. The sorter uses the values of one or more implementation attributes associated with the implementations to determine the order in which the implementations should be called. The implementation attributes can be predefined implementation attributes provided by the development environment. The application developer can also define additional implementation attributes to be used by the sorter. The logger 315 can be used to log the result of calling the multiple implementations of the extension object. The dynamic proxy for the extension object interface 300 also includes an interface to a result handler 310 if a result handler is implemented by the extension object. The result handler 310 is called after all the implementations of the extension object have been called. The result handler 310 evaluates the results from the multiple implementations of the application extension and determines the results that are returned to the standard application.

Figure 4:
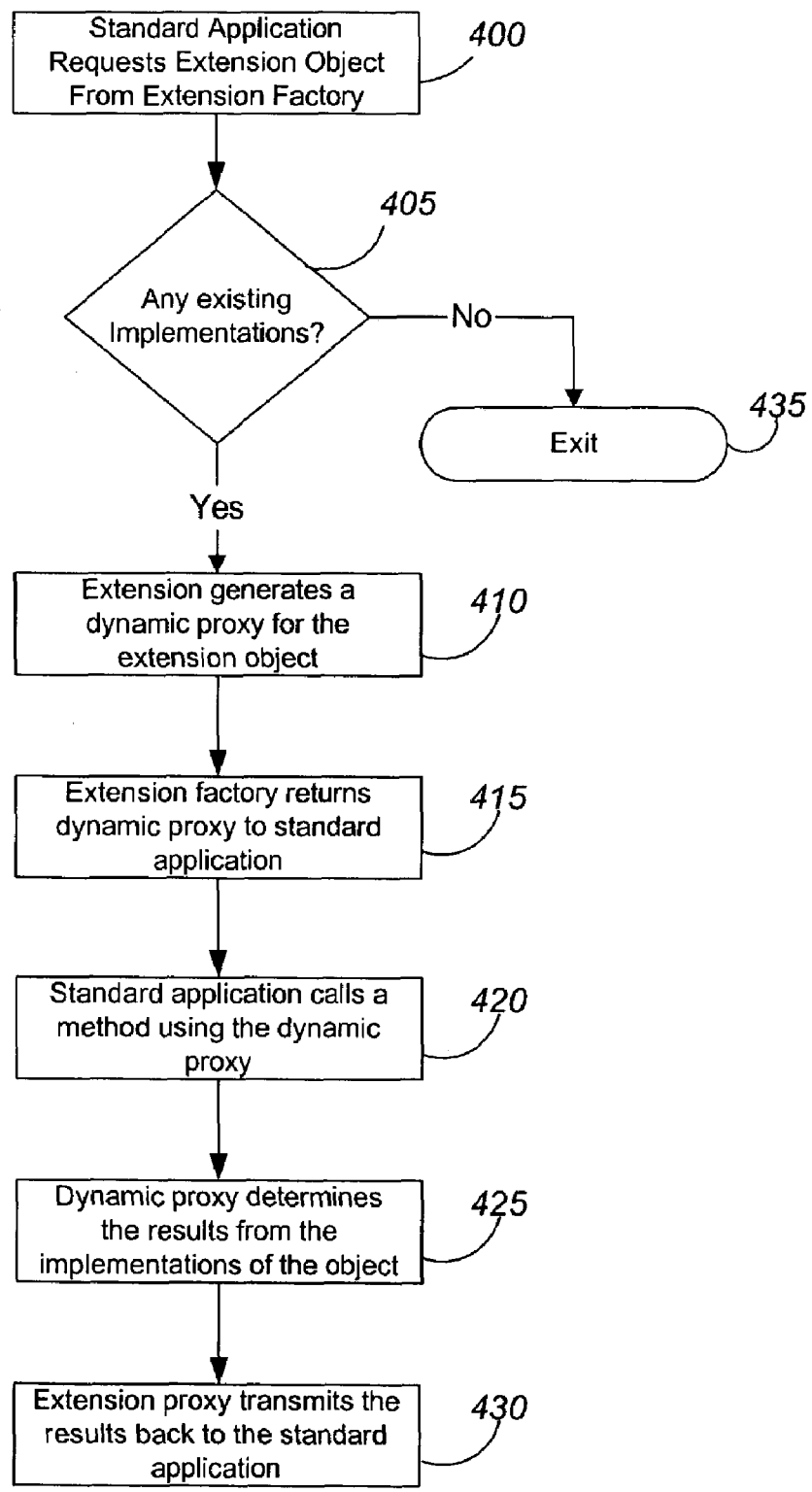
FIG. 4 is a flow diagram illustrating a method of calling an extension object implemented by an application extension.

FIG. 4 is a flow diagram illustrating a method of calling an extension object implemented by an application extension. A method of the standard application requests the extension factory for an extension object that is implemented by the extension object interface (step 400). The extension factory checks the entries in the central extension registry to determine if there are any existing implementations for the given extension object (step 405). If there are implementations for the given extension, the extension factory generates a dynamic proxy for the extension object (step 410) and returns the dynamic proxy to the method of the standard application requesting the extension object (step 415). The method of the standard application calls a method of the extension object through the dynamic proxy (step 420). The dynamic proxy determines the result of calling the method of the extension object from the implementations of the extension object that are registered in the extension registry (step 425). The results obtained by the dynamic proxy are transmitted to the method of the standard application that called the method of the extension object (step 430). If no extensions for the requested extension object are found in the extension registry during step 405, the process exits and the standard application is notified (step 435).

Figure 5:
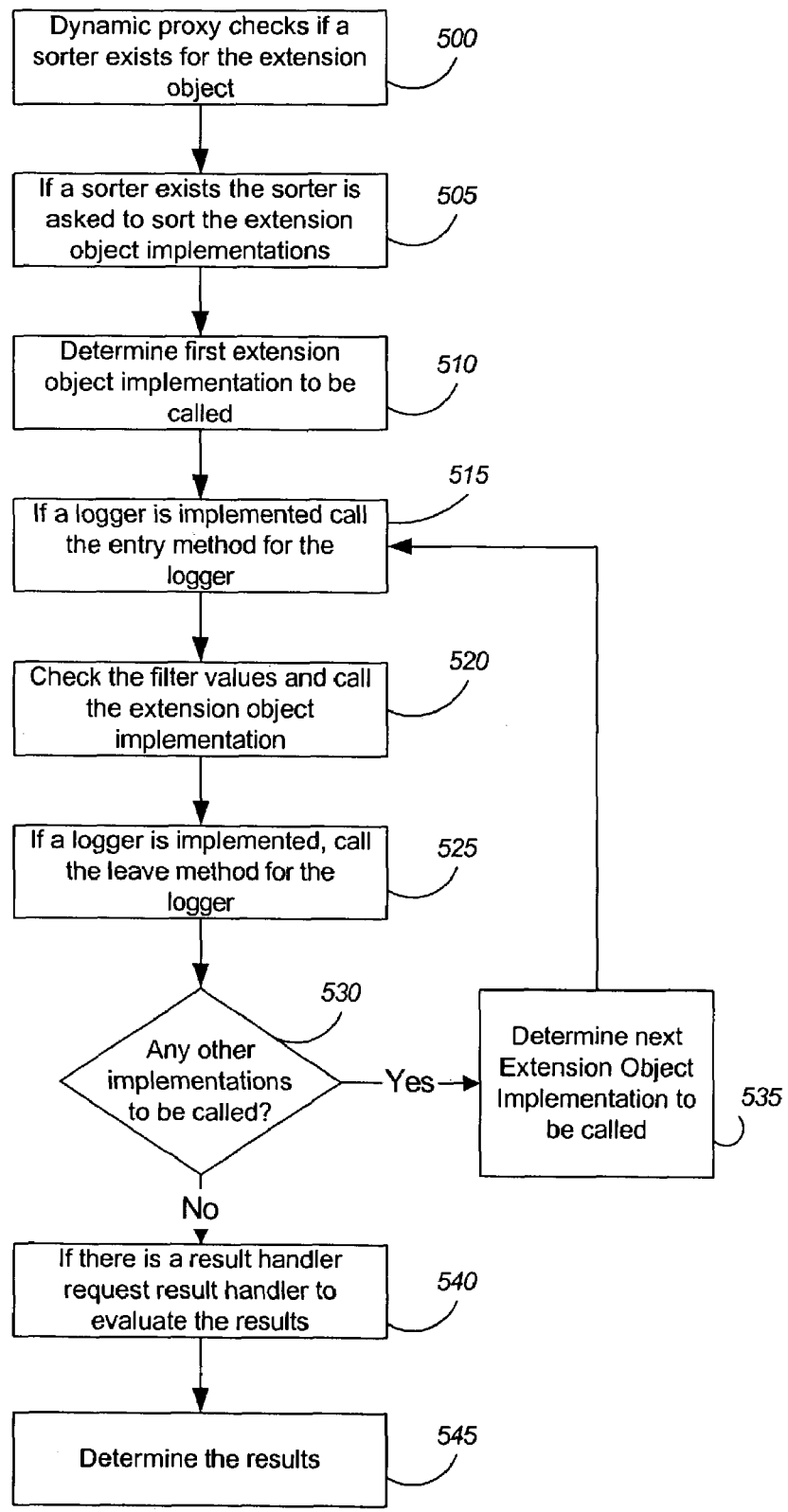
FIG. 5 is a flow diagram illustrating the determination of results obtained from calling the implementations of the extension object.

FIG. 5 is a flow diagram illustrating the determination of results obtained from calling the implementations of the extension object. The dynamic proxy for the extension object checks if a sorter, e.g., the sorter 305 (FIG. 3), is assigned for the extension object associated with the dynamic proxy (step 500). If a sorter is assigned for the extension object, the sorter is asked to sort the extension object implementations and determine the order in which the extension object implementations should be called (step 505). The sorter determines the first extension object implementation that should be called by the dynamic proxy for the extension object (step 510). The dynamic proxy for the extension objects also checks if a logger, e.g., the logger 315 (FIG. 3), is assigned for the extension object. If a logger is assigned, the entry method for the logger is called (step 515) before calling the implementation of the extension object (step 520). Before calling the extension object implementation in step 520, the dynamic proxy checks the filter values for the extension object that are retrieved from the central repository, e.g., the central repository 110 (FIG. 1), to determine if the extension object implementation should be called. If a logger is assigned for the extension object, the leave method for the logger is called after calling the implementation of the extension object (step 525). The dynamic proxy for the extension object checks to determine if there are any other implementations of the extension object that have to be called (step 530). If there are any other implementations to be called, the dynamic proxy for the extension object determines the next extension object implementation that is to be called (step 535), and control passes to step 515. If there are no other implementations that need to be called, the extension object is checked to determine if there is an assigned result handler. If a result handler is assigned for the extension object, the dynamic proxy for the extension object requests the result handler to evaluate the results obtained from the extension object implementations (step 540), and the results are determined (step 545).

In the scenario of FIG. 5, the application developer can assign a sorter, logger, and result handler for the extension object. The application developer can also allow the extension developer to assign a sorter, logger, and result handler for the extension object. If a sorter is not assigned for the extension object, the extension object implementations are called in what to the extension developer is a random order. If a logger is not assigned for the extension object, the entry method (step 515) and leave method (step 525) are not called, and the calls to the extension object implementations are not logged. If multiple implementations of the extension object are called and a result handler is not assigned for the extension object, the dynamic proxy for the extension object returns the result obtained from the last extension object implementation called.

Figure 6:
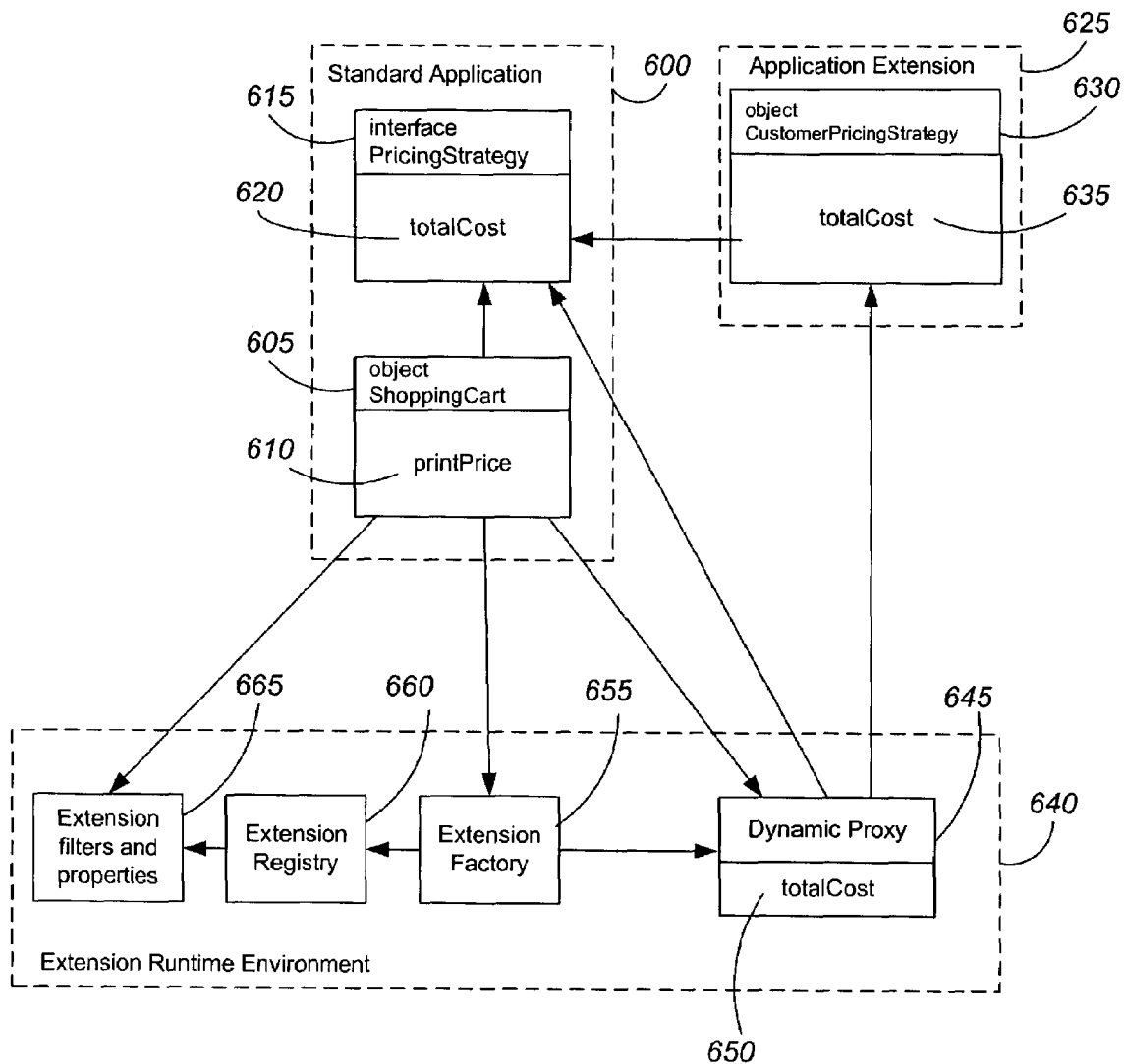
FIG. 6 illustrates an example of extending a standard application.

FIG. 6 illustrates an example of extending a standard application. The example standard application 600 implements a shopping application using the object ShoppingCart 605. An extension developer customizes the standard application 600 to include customer specific pricing strategies by implementing an extension object CustomerPricingStrategy 630 as part of an application extension 615. The extension developer registers the extension object CustomerPricingStrategy 630 in the extension registry 660. The application developer for the standard application 600, defines an extension object interface PricingStrategy 615 and includes it in the standard application. A method printPrice 610, implemented by ShoppingCart 605, calls a method totalCost 620 defined in PricingStrategy 615. The concrete implementation of the method totalCost is provided by the extension object CustomerPricingStrategy 630. The standard application 600 requests the extension object from the extension factory 655. The extension factory 655 determines that the extension object CustomerPricingStrategy 630 is registered in the extension registry 660, and returns a dynamic proxy 645 for the extension object to the standard application. The method printPrice 610 calls concrete method of the extension object 635 through the method totalCost 650 provided by the dynamic proxy 645. The dynamic proxy 645 determines the results from the implementation of the extension object 630 using the filtervalues retrieved from the central repository 665. The dynamic proxy 645 transmits the results to the method printPrice 610.

The invention can be implemented in digital electronic circuitry, or in computer hardware, firmware, software, or in combinations of them. The invention can be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the invention can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

The invention can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the invention, or any combination of such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

The invention has been described in terms of particular embodiments. Other embodiments are within the scope of the following claims. For example, the steps of the invention can be performed in a different order and still achieve desirable results.

What is claimed is:

1. A computer program product tangibly embodied in a machine-readable storage device, the product comprising instructions operable to cause data processing apparatus to:
   receive an application call to a method defined in an extension object interface included in the application and implemented by an extension object;
   implement the extension object by an application extension, the application extension having two or more extension object implementations of the extension object, each extension object implementation providing a distinct extension method implementation, each extension method implementation being an implementation of the method defined in the extension object interface;
   register the extension object in an extension registry, the extension registry being part of an application extension runtime environment, the application extension runtime environment further having an extension factory and an extension repository;
   identify by the extension factory at least one of the two or more extension object implementations registered in the extension registry;
   obtain multiple extension results by calling each of the two or more extension object implementations, each of the two or more extension object implementations producing a respective extension result responsive to the application call;
   use a result handler that is implemented by the extension object to evaluate the multiple extension results from the two or more extension object implementations after all of the extension object implementations have been called and use the result handler to determine results to be returned to the application call; and
   respond to the application call with the results to be returned.

2. The computer program product of claim 1, wherein the instructions to obtain multiple extension results by calling each of the two or more extension object implementations comprise instructions to:
   identify the extension object;
   generate a proxy for the identified extension object, the proxy being operable to call each of the two or more extension object implementations; and
   call the proxy to obtain multiple extension results of calling each of the two or more extension object implementations.

3. The computer program product of claim 2, wherein: the proxy is generated at a compile time or deploy time.

4. The computer program product of claim 2, wherein: the proxy is a dynamic proxy generated dynamically at run time.

5. The computer program product of claim 4, wherein:

the instructions to generate a proxy comprise using the extension factory to generate a proxy object.

6. The computer program product of claim 2, wherein:
the two or more extension object implementations have associated filter attribute values; and
the instructions to obtain multiple extension results by calling the two or more extension object implementations are operable to:
call exactly those extension object implementations having associated filter attribute values satisfying one or more predetermined criteria.

7. The computer program product of claim 6, wherein:
the filter attribute values are stored in a central repository.

8. The computer program product of claim 6, wherein:
the two or more extension object implementations have an associated sorter that is implemented by the extension object; and
the associated softer uses the filter attribute values to determine an order in which the implementations should be called.

9. The computer program product of claim 2, wherein:
the extension object implementations have an associated softer that is implemented by the extension object and that uses filter attribute values associated with the extension object implementations to determine an order in which the extension object implementations are called; and
the extension object implementations have an associated logger that is implemented by the extension object and that logs the calls to the extension object implementations.

10. The computer program product of claim 1, wherein:
the two or more extension object implementations have an associated logger that is implemented by the extension object; and
the associated logger logs the calls to the extension object implementations.

11. The computer program product of claim 1, wherein:
the instructions to receive an application call comprise instructions to receive a call from a Java application.

12. The computer program product of claim 11, wherein:
the instructions to obtain multiple extension results comprise instructions to call a non-Java extension object implementation.

13. A computer implemented method, comprising:
deploying two or more extension object implementations of an extension object that is implemented by an application extension, each extension object implementation being associated with the application extension and providing a distinct extension method implementation, each extension method implementation being an implementation of a method defined in an extension object interface included in the application and implemented by the extension object;
registering the extension object in an extension registry, the extension registry being part of an application extension runtime environment, the application extension runtime environment further having an extension factory and an extension repository;
identifying by the extension factory at least one of the two or more extension object implementations registered in the extension registry;
receiving a request, the request made using the extension object interface;
executing each of the two or more extension object implementations to obtain multiple extension results, each of the two or more extension object implementations producing a respective extension result responsive to the application call; and
using a result handler that is implemented by the extension object to evaluate the multiple extension results from the two or more extension object implementations after all of the extension object implementations have been called and using the result handler to determine the results to be returned to the request; and
responding to the application call with the results to be returned.

14. The method of claim 13, wherein:
deploying the two or more extension object implementations comprises deploying the extension object into a runtime environment that generates a dynamic proxy for the extension object; and
executing each of the two or more extension object implementations comprises:
executing the dynamic proxy to derive the results of executing each of the two or more extension object implementations.

15. The method of claim 13, wherein:
the two or more extension object implementations have associated filter attribute values; and
executing each of the two or more extension object implementations comprises:
executing exactly those extension object implementations having associated filter attribute values satisfying one or more predetermined criteria.

16. The method of claim 15, wherein:
the two or more extension object implementations have an associated sorter that is implemented by the extension object; and
the associated softer uses the filter attribute values to determine an order in which the implementations should be called.

17. The method of claim 13, wherein:
the two or more extension object implementations have an associated logger that is implemented by the extension object; and
the logger logs the calls to the extension object implementations.

18. A computer implemented method, comprising:
receiving an application call to a method defined in an extension object interface included in the application and implemented by an extension object;
implementing the extension object by an application extension, the application extension having two or more associated extension object implementations of the extension object, each extension object implementation providing a distinct extension method implementation, each extension method implementation being an implementation of the method defined in the extension object interface;
registering the extension object in an extension registry, the extension registry being part of an application extension runtime environment, the application extension runtime environment further having an extension factory and an extension repository;
identifying by the extension factory at least one of the two or more extension object implementations registered in the extension registry;
obtaining multiple extension results by calling each of the two or more extension object implementations, each of the two or more extension object implementations producing a respective extension result responsive to the application call;

using a result handler that is implemented by the extension object to evaluate the multiple extension results from the two or more extension object implementations after all of the extension object implementations have been called and using the result handler to determine the results to be returned to the application call; and responding to the application call with the results to be returned.

19. The method of claim 18, wherein obtaining multiple extension results by calling each of the two or more multiple extension object implementations comprises:

identifying the extension object;

generating a proxy for the identified extension object, the proxy being operable to call each of the two or more extension object implementations corresponding to the identified extension object; and calling the proxy to obtain multiple extension results of calling each of the two or more extension object implementations.

20. The method of claim 19, wherein:

generating the proxy comprises generating the proxy at a compile time or deploy time.

21. The method of claim 19, wherein:

the proxy is a dynamic proxy generated dynamically at run time.

22. The method of claim 21, wherein:

generating the proxy comprises generating a proxy object using the extension factory.

23. The method of claim 19, wherein:

the extension object implementations have an associated sorter that is implemented by the extension object and that uses filter attribute values associated with the extension object implementations to determine an order in which the extension object implementations are called; and the extension object implementations have an associated logger that is implemented by the extension object and that logs the calls to the extension object implementations.

24. The method of claim 18, wherein:

the two or more extension object implementations have associated filter attribute values; and obtaining the multiple extensions results by calling each of the two or more extension object implementations comprises:

calling exactly those extension object implementations having associated filter attribute values satisfying one or more predetermined criteria.

25. The method of claim 24, wherein:

the filter attribute values are stored in a central repository.

26. The method of claim 24, wherein:

the two or more extension object implementations have an associated sorter that is implemented by the extension object; and the associated sorter uses the filter attribute values to determine an order in which the extension object implementations are called.

27. The method of claim 18, wherein:

the two or more extension object implementations have an associated logger that is implemented by the extension object; and the logger logs the calls to the extension object implementations.

28. The method of claim 18, wherein:

receiving an application call comprises receiving a call from a Java application.

29. The method of claim 28, wherein:

obtaining multiple extension results by calling extension object implementations comprises calling a non-Java extension object implementation.

30. A computer system, comprising:

a processor; means for receiving an application call to a method defined in an extension object interface included in the application and implemented by an extension object, means for implementing the extension object by an application extension, the application extension having two or more associated extension object implementations of the extension object, each extension object implementation providing a distinct extension method implementation, each extension method implementation being an implementation of the method defined in the extension interface, means for registering the extension object in an extension registry, the extension registry being part of an application extension runtime environment, the application extension runtime environment further having an extension factory and an extension repository;

means for identifying by the extension factory at least one of the two or more extension object implementations registered in the extension registry;

means for obtaining multiple extension results by calling each of the two or more extension object implementations, each of the two or more extension object implementations producing a respective extension result responsive to the application call;

means for using a result handler that is implemented by the extension object to evaluate the multiple extension results from the two or more extension object implementations after all of the extension object implementations have been called and using the handler to determine the results to be returned to the application call; and means for responding to the application call with the results to be returned.

31. The system of claim 30, wherein means for obtaining multiple extension results by calling each of the two or more multiple extension object implementations comprises:

means for identifying the extension object;

means for generating a proxy for the identified extension object, the proxy being operable to call each of the two or more extension object implementations corresponding to the identified extension object; and means for calling the proxy to obtain multiple extension results of calling each of the two or more extension object implementations.

32. The system of claim 30, wherein:

the extension object implementations have associated filter attribute values; and obtaining the multiple extensions results by calling each of the two or more extension object implementations comprises:

calling exactly those extension object implementations having associated filter attribute values satisfying one or more predetermined criteria.

33. The system of claim 32 wherein:

the two or more extension object implementations have an associated sorter that is implemented by the extension object; and the associated softer uses the filter attribute values to determine an order in which the extension object implementations are called.

* * * * *